US010919813B2

(12) United States Patent
Cano

(10) Patent No.: US 10,919,813 B2
(45) Date of Patent: Feb. 16, 2021

(54) SYSTEM AND METHOD FOR EXPOSED AGGREGATE ARCHITECTURAL COATING FOR EXISTING CONCRETE STRUCTURES

(71) Applicant: Ray Cano, Ontario, CA (US)

(72) Inventor: Ray Cano, Ontario, CA (US)

(73) Assignee: FIRMECRETE INC., Ontario, CA (US)

( * ) Notice: Subject to any disclaimer, the term of this patent is extended or adjusted under 35 U.S.C. 154(b) by 0 days.

(21) Appl. No.: 16/446,530

(22) Filed: Jun. 19, 2019

(65) Prior Publication Data
US 2020/0399186 A1 Dec. 24, 2020

(51) Int. Cl.
C04B 41/50 (2006.01)
C04B 41/00 (2006.01)
(Continued)

(52) U.S. Cl.
CPC .......... C04B 41/5076 (2013.01); C04B 14/06 (2013.01); C04B 28/02 (2013.01);
(Continued)

(58) Field of Classification Search
CPC ..... C04B 41/5076; C04B 14/06; C04B 28/02; C04B 41/009; C04B 41/65
See application file for complete search history.

(56) References Cited

U.S. PATENT DOCUMENTS 1,637,321 A 6/1925 Johnson
2,200,433 A 5/1940 Ripley
(Continued)

FOREIGN PATENT DOCUMENTS

WO WO 01/36762 A1 5/2001

OTHER PUBLICATIONS

Sullivan, Chris, Decorative Concrete Overlays: The Power is in the Polymer, Concrete Decor, Feb. 19, 2012 accessed Aug. 6, 2019 from https://www.concretedecor.net/decorativeconcretearticles/vol-12-no-2-febmar-2012/trowel-error-decorative-overlays-the-power-is-in-the-polymer/ (Year: 2012).*

(Continued)

Primary Examiner — Kelly M Gambetta
(74) Attorney, Agent, or Firm — Jafari Law Group, Inc.

(57) ABSTRACT

The invention involves an exposed aggregate architectural coating to be applied to existing concrete structures. The invention includes a method of preparing and roughening an existing concrete structure surface, mixing the components of the exposed aggregate architectural coating, applying the coating to the existing concrete structure, spreading the coating to a thickness of one-fourth of an inch or thinner, using a trowel, gauge rake, or other method to smoothen the coating, allowing the coating to cure, applying a surface retarder once the exposed aggregate architectural coating has stiffened, allowing the surface retarder to cure for twenty-four hours, and washing the surface with a pressure-washer to remove the surface retarder, then "acid-washing" the surface to remove residue and create a desired texture. The resulting applied exposed aggregate architectural coating will have an exposed aggregate finish that is durable and suitable for high vehicular and pedestrian traffic areas.

20 Claims, 9 Drawing Sheets

(51) Int. Cl.
    *C04B 41/65* (2006.01)
    *C04B 14/06* (2006.01)
    *C04B 28/02* (2006.01)
    *C04B 111/72* (2006.01)
    *C04B 111/00* (2006.01)

(52) U.S. Cl.
    CPC ............ *C04B 41/009* (2013.01); *C04B 41/65* (2013.01); *C04B 2111/00508* (2013.01); *C04B 2111/72* (2013.01)

(56) References Cited

U.S. PATENT DOCUMENTS

| | | | |
|---|---|---|---|
| 2,277,203 A | 3/1942 | Boult | |
| 3,334,555 A | 8/1967 | Nagin | |
| 4,662,972 A | 5/1987 | Thompson | |
| 4,748,788 A | 6/1988 | Shaw | |
| 5,026,576 A | 6/1991 | Benvenuto | |
| 5,069,939 A * | 12/1991 | McKinnon | B28B 1/005 427/262 |
| 5,494,729 A | 2/1996 | Henry | |
| 5,645,664 A | 7/1997 | Clyne | |
| 5,735,094 A * | 4/1998 | Zember | B28B 11/0818 427/282 |
| 5,794,401 A | 8/1998 | Shaw | |
| 5,887,399 A | 3/1999 | Shaw | |
| 5,950,394 A | 9/1999 | Shaw | |
| 6,016,635 A | 1/2000 | Shaw | |
| 6,033,146 A | 3/2000 | Shaw | |
| 6,082,074 A | 7/2000 | Shaw | |
| 6,568,146 B2 | 5/2003 | Harvey | |
| 6,609,340 B2 | 8/2003 | Moore | |
| 6,610,224 B2 | 8/2003 | Sullivan | |
| 6,907,708 B2 | 6/2005 | Naji | |
| 7,351,004 B2 | 4/2008 | Shaw | |
| 7,493,732 B2 | 2/2009 | Brailsford | |
| 7,614,820 B2 | 11/2009 | Shaw | |
| 7,781,019 B2 | 8/2010 | Shaw | |
| 8,246,269 B2 | 8/2012 | Shaw | |
| 8,936,411 B1 | 1/2015 | Shaw | |
| 8,962,088 B2 | 2/2015 | Shaw | |
| 9,562,360 B2 | 2/2017 | Brailsford | |
| 9,695,602 B2 | 7/2017 | Shaw | |
| 2002/0148195 A1 | 10/2002 | Ward | |
| 2004/0041295 A1 | 3/2004 | Shaw | |
| 2004/0159073 A1 | 8/2004 | Palermo | |
| 2006/0180507 A1 | 8/2006 | DeHart | |
| 2006/0207213 A1 | 9/2006 | Lindgren | |
| 2007/0071550 A1 | 3/2007 | Shaw | |
| 2007/0071551 A1 | 3/2007 | Shaw | |
| 2007/0086860 A1 | 4/2007 | Shaw | |
| 2007/0104538 A1 | 5/2007 | Shaw | |
| 2010/0150654 A1 | 6/2010 | Shaw | |
| 2010/0180528 A1 | 7/2010 | Shaw | |
| 2013/0118114 A1 | 5/2013 | Brailsford et al. | |
| 2013/0266375 A1 | 10/2013 | Shaw | |
| 2014/0272147 A1 | 9/2014 | Shaw | |
| 2014/0346699 A1 | 11/2014 | Shaw | |
| 2018/0186175 A1 | 7/2018 | Shaw | |

OTHER PUBLICATIONS

Bondlt, PVA Adhesive and Sealer: All purpose primer, sealer & bonding agent, Sep. 2002, accessed Jan. 8, 2020 from http://www.laydex.com/laydexdocs/PVA%20ADHESIVE%20&%20SEALER.pdf. (Year: 2002).*

* cited by examiner

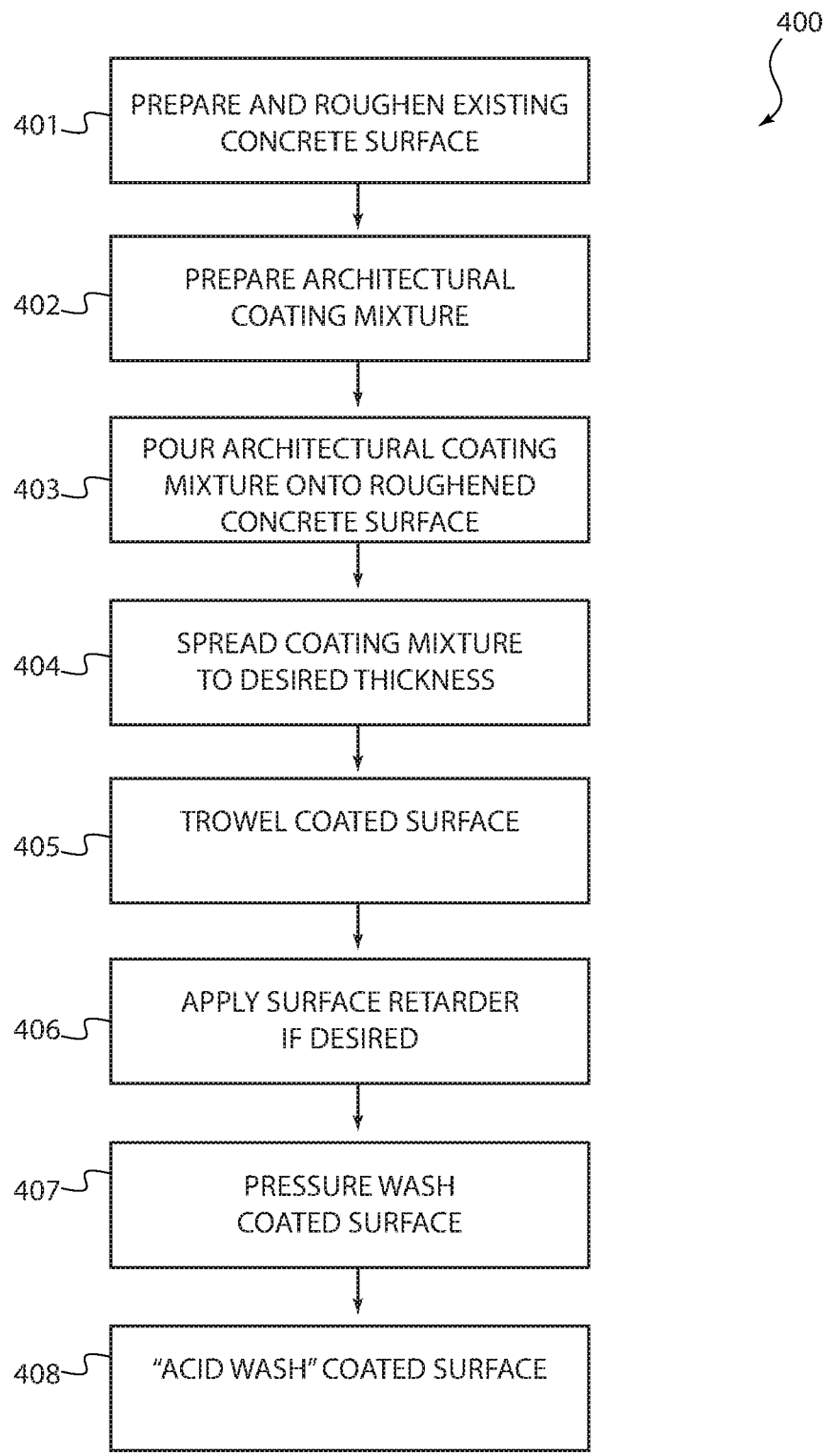

FIG. 5A

Exposed Aggregate Architectural Coating Ingredient Ratios - Flooring

| Inches | Sand (Part A) | Cement (Part A) | Glue (Part B) | Water (Part B) | Application Method |
|---|---|---|---|---|---|
| < 1/8 in. | 14 - 16 parts (47 - 50 %) | 16 parts (50 - 53 %) | 1 part (25 %) | 3 parts (75 %) | Squeegee, Trowel |
| 1/8 in. | 14 - 16 parts (47 - 50 %) | 16 parts (50 - 53 %) | 1 part (25 %) | 3 parts (75 %) | Gauge Rake (etc.) |
| 1/4 in. | 14 - 22 parts (41 - 44 %) | 20 - 28 parts (56 - 59 %) | 1 part (25 %) | 3 parts (75 %) | Gauge Rake (etc.) |

- "Part(s)": any uniform measuring unit may be used in place of a "part", e.g. pounds (lbs.) or quarts.
- The ratio of Part A to Part B must not exceed 3.5 to 6 quarts of Part A per 50 pounds (lbs.) of Part B.

FIG. 5B

Exposed Aggregate Architectural Coating Ingredient Ratios - Walls

| Inches | Sand (Part A) | Cement (Part A) | Glue (Part B) | Water (Part B) | Application Method |
|---|---|---|---|---|---|
| < 1/8 in. | 14 - 16 parts (47 - 50 %) | 16 parts (50 - 53 %) | 1 part (14 %) | 6 parts (86 %) | Spray, Trowel |
| 1/8 in. | 14 - 16 parts (47 - 50 %) | 16 parts (50 - 53 %) | 1 part (14 %) | 6 parts (86 %) | Spray, Trowel |
| 1/4 in. | 14 - 22 parts (41 - 44 %) | 20 - 28 parts (56 - 59 %) | 1 part (14 %) | 6 parts (86 %) | Spray, Trowel |

- "Part(s)": any uniform measuring unit may be used in place of a "part", e.g. pounds (lbs.) or quarts.
- The ratio of Part A to Part B must not exceed 3.5 to 6 quarts of Part A per 50 pounds (lbs.) of Part B.

SYSTEM AND METHOD FOR EXPOSED AGGREGATE ARCHITECTURAL COATING FOR EXISTING CONCRETE STRUCTURES

TECHNICAL FIELD OF THE INVENTION

The present disclosure relates generally to resurfacing existing concrete structures, and more specifically, a system and method for an exposed aggregate architectural coating used to restore existing concrete structures.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

It is well known in the fields of construction and architecture that concrete can be utilized as a flooring and wall material for both commercial and residential purposes. The use of concrete flooring and wall structures in high traffic areas over a number of years results in worn-down, old concrete, with undesirable concrete finishes. The concrete flooring and wall material may still be structurally sound, but no longer aesthetically pleasing. As a solution, the concrete trade has developed multiple exposed aggregate concrete finishes in various colors, textures, and methods of application.

However, a drawback to these finishes is that the existing structurally-sound concrete, plumbing, and electrical wiring typically need to be demolished and removed, in order to install the new concrete finish. Moreover, installing new plumbing, electrical wiring, and full minimum-depth exposed aggregate flooring, which is typically a minimum of four inches thick or greater, is labor-intensive, time-consuming, and expensive.

Accordingly, there is an inadequately addressed need for an architectural coating that can be installed over the existing structurally-sound concrete, and which will result in the desirable, aesthetically pleasing, exposed aggregate finish, without requiring demolition or re-installation of any plumbing, electrical wiring, or other sound pre-existing structures. Such an architectural coating will result in an exposed aggregate finish, and will be less time-consuming to install, while still being extremely durable and capable of withstanding rigorous pedestrian and vehicular traffic, even at a thickness of less than one fourth of an inch.

Therefore, there is a need for a system and method for exposed aggregate architectural coating used to restore existing concrete structures, which addresses the above-mentioned concerns. It is to these ends that the present invention has been developed.

SUMMARY OF THE INVENTION

To minimize the limitations in the prior art, and to minimize other limitations that will become apparent upon reading and understanding the present specification, the present invention describes a system and method for applying an exposed aggregate architectural coating to restore existing concrete structures, the exposed aggregate architectural coating typically comprising a thin, durable, coating material applied to existing concrete structures that have been roughened, or otherwise prepared, to preserve the integrity of the pre-existing concrete structures.

Generally, the invention involves implementation of an exposed aggregate architectural coating applied to existing concrete structures. The present invention addresses and alleviates having to remove existing structurally-sound concrete and sound infrastructure embedded in the concrete. In accordance with the present invention, the exposed aggregate architectural coating is comprised of a modified, cement-based, two-part polymer. In some exemplary embodiments, the exposed aggregate architectural coating is thinner than standard concrete finishing materials, which makes installation less labor-intensive and time-consuming, while still having the ability to withstand high vehicular and pedestrian traffic. In exemplary embodiments, the architectural coating can be mixed with different types of sand, such as silica sand, silica carbide, or other sand material, so as to present various colors and various exposed aggregates and broadcasted materials.

A method for preparing and applying an exposed aggregate architectural coating, in accordance with some exemplary embodiments of the present invention, may include the steps of: preparing a first composition by combining 41 to 50 percent sand with 50 to 59 percent cement; preparing a second composition by combining 75 to 86 percent water with 14 to 25 percent glue combining the first composition with the second composition to form an exposed aggregate architectural coating; preparing a pre-existing cement structure to create a roughened surface having a concrete surface profile of three or greater; and applying the exposed aggregate architectural coating to the roughened surface of the pre-existing cement structure, wherein the exposed aggregate architectural coating forms a thickness of between $\frac{1}{32}$nd of an inch and one-fourth of an inch above the roughened surface.

A method for preparing and applying an exposed aggregate architectural coating to a flooring surface, in accordance with some exemplary embodiments of the present invention, may include the steps of: preparing a first composition by combining 41 to 50 percent sand with 50 to 59 percent cement; preparing a second composition by combining 75 percent water with 25 percent glue; combining the first composition with the second composition to form an exposed aggregate architectural coating; preparing a pre-existing cement structure to create a roughened surface having a concrete surface profile of three or greater; and applying the exposed aggregate architectural coating to the roughened surface of the pre-existing cement structure, wherein the exposed aggregate architectural coating forms a thickness of between $\frac{1}{32}$nd of an inch and one-fourth of an inch.

A method for preparing and applying an exposed aggregate architectural coating to a wall surface, in accordance with some exemplary embodiments of the present invention, may include the steps of: preparing a first composition by combining 41 to 50 percent sand with 50 to 59 percent cement; preparing a second composition by combining 86 percent water with 14 percent glue; combining the first composition with the second composition to form an exposed aggregate architectural coating; preparing a pre-existing cement structure to create a roughened surface having a concrete surface profile of three or greater; and applying the exposed aggregate architectural coating to the roughened surface of the pre-existing cement structure, wherein the exposed aggregate architectural coating forms a thickness of between 1/32nd of an inch and one-eighth of an inch.

In some exemplary embodiments of the present invention, the existing structurally-sound concrete substrate or surface on which the architectural coating will be applied will first need to be prepared to create a roughened surface for the subsequent application of the exposed aggregate architectural coating. The roughening of the existing surface may be achieved by grinding, shot-blasting and/or sandblasting. In exemplary embodiments where the exposed aggregate architectural coating will be applied using a gauge raking method, any imperfections in the existing concrete surface, such as cracks, dips, or holes, should also be repaired. Once the existing surface has been roughened and prepared, the architectural coating composition is applied to the roughened surface and spread over the surface such that the architectural coating is one-fourth of an inch in thickness or less. The architectural coating can then be troweled, such as with a vibrating trowel. The surface of the architectural coating may then also be finish troweled, such as with a weighted trowel, to achieve still a smoother finish.

In some exemplary embodiments, a surface retarder may be applied to the architectural coating and left to cure and harden for approximately twenty-four hours. In other exemplary embodiments, as an alternative to applying a surface retarder, chemical etching can instead be utilized to create a smoother, etched surface. After about twenty-four hours have elapsed, the surface retarder may be washed away to expose the aggregate architectural coating. After yet another twenty-four hours have elapsed, any surface residue and laitance may also be removed by etching the surface using detergents and etching chemicals, i.e. "acid-washing."

An exposed aggregate architectural coating in accordance with some exemplary embodiments may be comprised of a modified, two-part polymer, cement-based architectural-topping and wall-coating material. The architectural coating is used to resurface existing old, deteriorated concrete, for the purpose of refreshing the concrete, and for the additional purpose of enhancing the concrete finish, leaving the coating with a sanded or exposed aggregate finish. Additionally, the architectural coating may also be used to resurface new concrete, such as to create a different aesthetic style, which process is still more cost effective and affordable than use of traditional concrete material.

The exposed aggregate architectural coating can have a visually stunning appearance, particularly if broadcasted with anyone-fourth inch or smaller natural or plastic aggregate materials, including glass, seashells, or the like. The architectural coating will tenaciously bond to an existing substrate surface, such as a pre-existing concrete surface, concrete masonry unit, or the like. The architectural coating material is extremely durable and can withstand vehicular traffic within seventy-two hours of being applied in accordance with exemplary embodiments of the application method, and can withstand heavy foot traffic within twenty-four hours of application. The architectural coating is suitable for both floors and walls, and is long lasting, durable, and visually appealing, yet still having a thickness of less than one-fourth of an inch, thereby enhancing the ease of installation. The architectural coating may be as thin as 1/32nd of an inch, while still being extremely durable and suitable for pedestrian and vehicular traffic for many years. Such a thin composition and application results in a much more cost-efficient and labor-efficient method for resurfacing concrete than the present industry-standard techniques. Such a thin composition also results in greater flexibility and cost-efficiency in terms of design needs and decorative preferences.

The untreated architectural coating material has a color of white or grey, thereby allowing the architectural coating material to be integrally colored using cement pigment to any desired color, to meet any creative and decorative needs. When the coating is applied to a thickness of one-fourth of an inch, the coating material can be broadcasted with any one-fourth of an inch or smaller natural, plastic, or other aggregate material, such as for example glass, sea shells, tumbled porcelain, or other materials serving decorative purposes. The thin composition of the exposed aggregate architectural coating reduces the amount of aggregate material needed to accomplish the broadcasting effect, thereby being more cost-efficient and labor-efficient.

The exposed aggregate architectural coating is intended to enhance the appearance of existing concrete in any location. The architectural coating is therefore suitable for both interior and exterior use, for both flooring and wall surfaces, and for both residential or commercial hardscapes or parking structures, without need to restrict the daily amount of traffic encountering the architectural coating.

The present invention therefore provides an exposed aggregate architectural coating for which installation does not require the demolition and removal of the existing structurally-sound concrete surface and any plumbing, electrical wiring, or other structures within the existing surface. In exemplary embodiments, the exposed aggregate architectural coating should not overload the weight capacity of the existing flooring or surface on which the architectural coating is applied. In exemplary embodiments, the exposed aggregate architectural coating is thinner than typical concrete finishing materials, which should result in installation being more cost-efficient and less labor-intensive and time-consuming, but which coating is highly durable and capable of withstanding high vehicular and pedestrian traffic.

BRIEF DESCRIPTION OF THE DRAWINGS

The system and the method for exposed aggregate architectural coating as disclosed herein are further described in terms of exemplary embodiments. These embodiments are described in detail with reference to the drawings, which have not necessarily been drawn to scale, in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 4 depicts a block diagram of an overview of a process utilized for applying an exposed aggregate architectural coating, in accordance with the practice of exemplary embodiments of the present invention.

FIG. 5A-FIG. 5B depict tables listing ingredients for exposed aggregate architectural coatings, in their respective amounts and proportions, for compositions in accordance with exemplary embodiments of the present invention.

DETAILED DESCRIPTION OF THE INVENTION

Figure 1A:
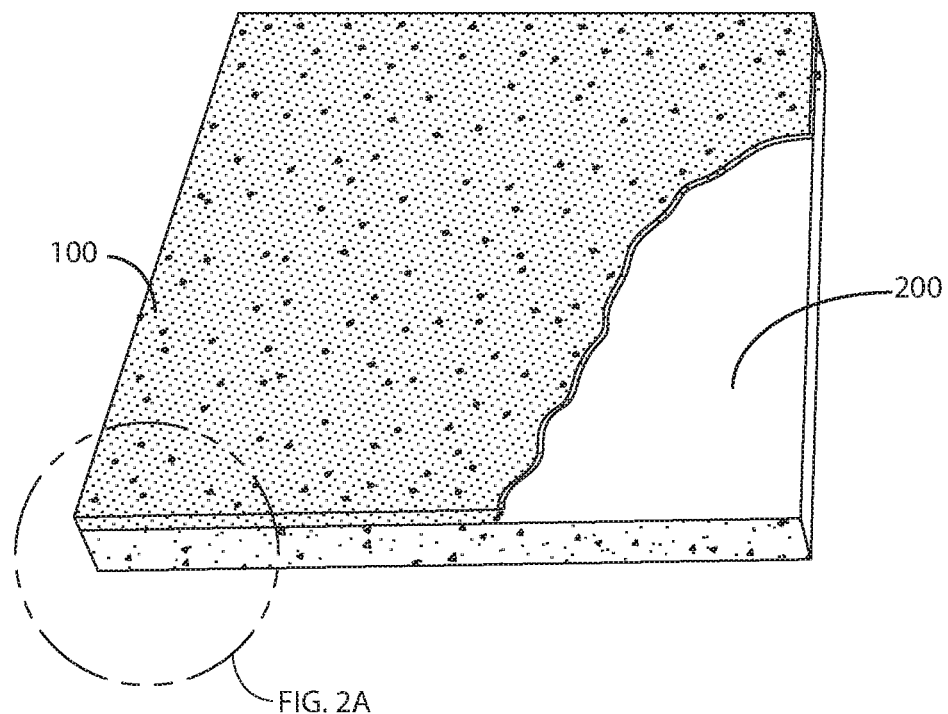
FIG. 1A illustrates a perspective and partial cross-sectional view of an architectural coating in accordance with exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of example in order to provide a thorough understanding of the relevant teachings. However, it should be apparent to those skilled in the art that the present teachings may be practiced without such details. In other instances, well known structures, components and/or functional or structural relationships thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and or steps are in any way required for one or more embodiments, whether these features, elements and/or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, a system and method for exposed aggregate architectural coating for existing concrete structures. Exemplary embodiments of the present disclosure are described with reference to the drawings for illustration purposes and are not intended to limit the scope of the present disclosure.

Figure 1B:
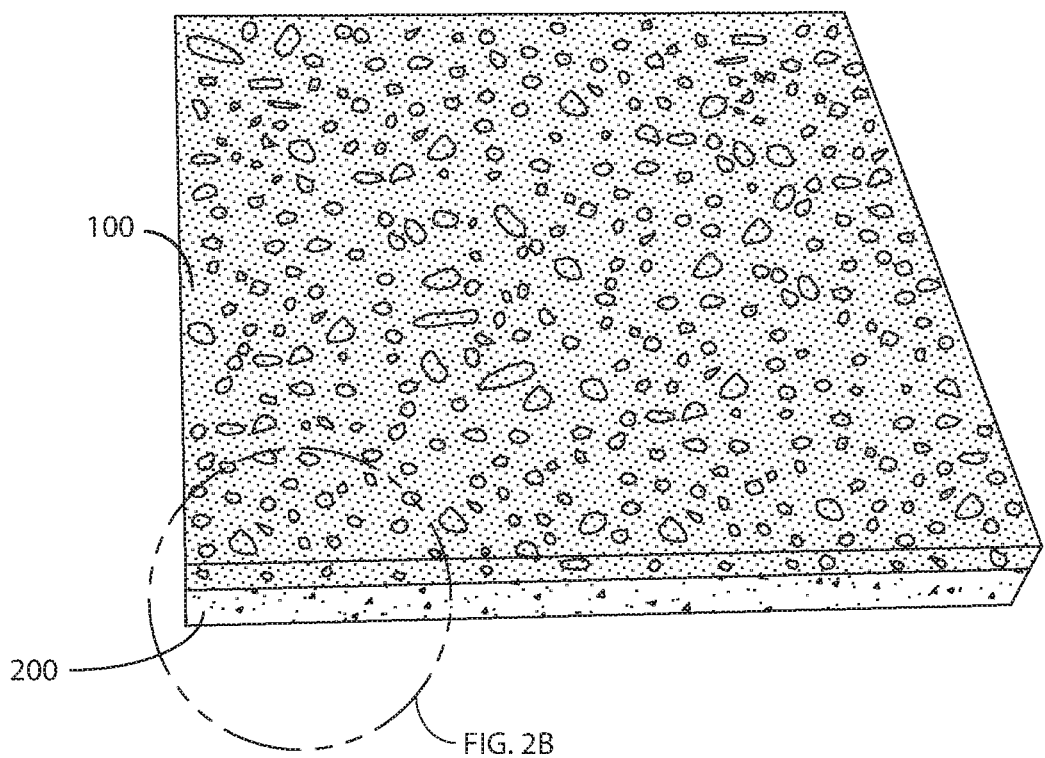
FIG. 1B illustrates a perspective view of an architectural coating in accordance with exemplary embodiments of the present invention.

Turning now to the figures, FIG. 1A and FIG. 1B illustrate partial cross-sectional views of exposed aggregate architectural coatings in accordance with exemplary embodiments of the present invention. In exemplary embodiments, the architectural coating 100 can be applied at various thicknesses, typically not greater than one-fourth of an inch but may also be applied in a thickness of up to one-half of an inch or greater, such as a thickness of 1/32nd of an inch, one-sixteenth of an inch, one-eighth of an inch, and up to one-fourth of an inch or greater, as a layer on top of a pre-existing concrete structure, for example, pre-existing concrete structure 200.

As may be appreciated from the view of FIG. 1A, in exemplary embodiments, the exposed aggregate architectural coating 100 may be generally applied to a pre-existing concrete structure 200 having a surface that has been previously prepared by, for example, roughening the surface as will be discussed further below. Generally, aggregate architectural coating 100 is comprised of a modified, two-part polymer, cement-based architectural-topping and or wall-coating material. FIG. 1B illustrates one exemplary embodiment of the architectural coating 100, which is thicker than the embodiment of FIG. 1A, and thus allows for broadcasting to be applied thereto. In either case, as will be discussed in greater detail below, the architectural aggregate 100 is applied on top of pre-existing concrete structure 200—typically once pre-existing concrete structure 200 has been prepared by, for example, creating a roughened surface having a suitable concrete surface profile as will be explained further with reference to FIG. 3B below.

The architectural coating 100 is used to resurface existing old, deteriorated concrete structure 200, for the purpose of refreshing the concrete structure 200, and for the additional purpose of enhancing the concrete finish of concrete structure 200, wherein the coating 100 has a sanded or exposed aggregate finish. Additionally, the architectural coating 100 may also be used to resurface new concrete, such as to create a different aesthetic style, which process is still more cost effective and affordable than use of traditional concrete material.

The exposed aggregate architectural coating 100 can have a visually stunning appearance, particularly if broadcasted with any one-fourth inch or smaller natural or plastic aggregate materials, including glass, sea shells, or the like. The architectural coating 100 will tenaciously bond to an existing substrate surface, such as the surface of pre-existing concrete structure 200. The architectural coating material 100 is extremely durable and can withstand vehicular traffic within seventy-two hours of being applied, and can withstand heavy foot traffic within twenty-four hours of application. The architectural coating 100 is suitable for both floors and walls, and is long lasting, durable, and visually appealing, yet still having a thickness of not greater than one inch, thereby enhancing the ease of installation.

In exemplary embodiments, the untreated architectural coating material has a color of white or grey, thereby allowing the architectural coating material to be integrally colored using cement pigment to any desired color, to meet any creative and decorative needs of architectural coating 100. This coloring is advantageous over other materials for cement surfacing known to those skilled in the art, because white cement is typically more expensive to purchase and apply, particularly when poured to the industry-standard thickness of a minimum of four inches. Therefore, according to an exemplary embodiment of application of the exposed aggregate architectural coating of this invention, a white and/or light-colored wall or flooring surface can be more easily and cost-efficiently created, because the architectural coating layer applied typically has a thickness of less than only one-fourth of an inch.

Figure 2A:
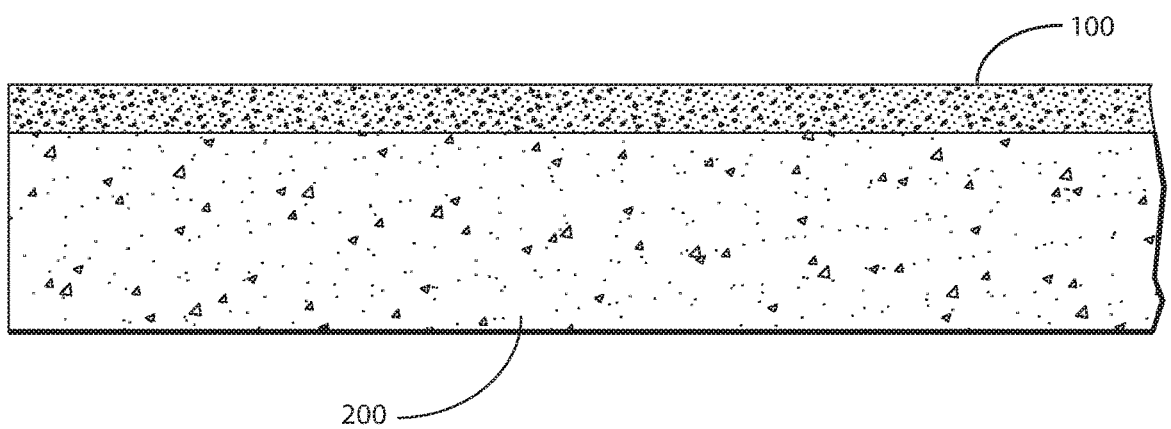
FIG. 2A illustrates a side cross-sectional close-up view of the architectural coating depicted in FIG. 1A.
Figure 2B:
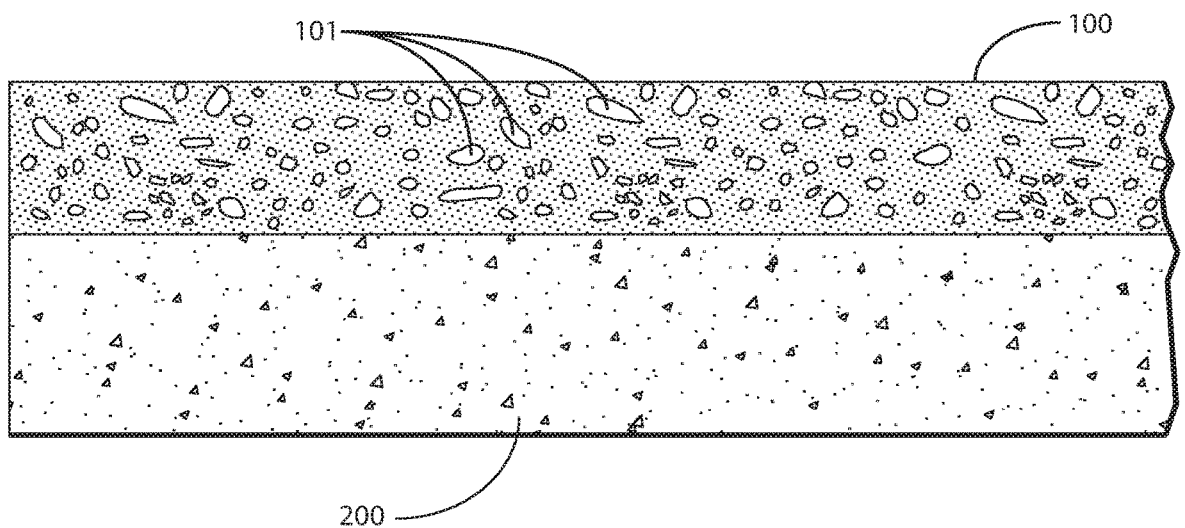
FIG. 2B illustrates a side cross-sectional close-up view of the architectural coating depicted in FIG. 1B.

As such, controlling the thickness and color of an architectural aggregate coating in accordance with the present invention may yield a variety of structurally protective, yet aesthetically appealing coatings for pre-existing concrete structures. For example, and in no way limiting the scope of the present invention, FIG. 2A illustrates a side cross-sectional close-up view of the architectural coating depicted in FIG. 1A, and FIG. 2B illustrates a side cross-sectional close-up view of the architectural coating depicted in FIG. 1B. These two close-up views show how a thinner version may exclude broadcasting, while a thin but slightly thicker version may include broadcasting.

As may be appreciated from FIG. 2B, when architectural coating 100 is applied to a thickness of at least one-fourth of an inch, the architectural coating 100 can be broadcasted with broadcasting aggregates 101 including but not limited to any one-fourth of an inch or smaller natural or plastic aggregate, such as for example glass or sea shells. The exposed aggregate architectural coating 100 is intended to enhance the appearance of existing concrete structures in any location, such as in exemplary embodiments, existing concrete structure 200. The architectural coating 100 is therefore suitable for both interior and exterior use, on residential or commercial hardscapes or parking structures, without need to restrict the amount of traffic encountering the architectural coating.

In exemplary embodiments, the exposed aggregate architectural coating material to create or form architectural coating 100 can be prepackaged, such as a prepackaged fifty-pound (50 lbs.) "Part A" mixture containing sand and cement, and a prepackaged five-quart (5 qts.) "Part B" mixture containing glue and water, so as to allow for an easy mixing of the ingredients that comprise the coating composition, which composition results in an aesthetically pleasing sand finish. The architectural coating 100 has the flexibility to contain broadcasting aggregates 101 and thus configured to receive the broadcasting of any sand, glass, sea shells, or other such materials into the architectural coating, thereby creating visually appealing surfaces. In some exemplary embodiments, the architectural coating 100 composition can be prepared in such a way so as to create custom sand blends and material blends in any creative manner to create various surface material compositions, resulting in different appearances and styles. In some exemplary embodiments, the aggregate architectural coating 100 composition can also be prepared with recycled plastic and recycled glass aggregates, in order to promote green building practices.

Figure 3A:
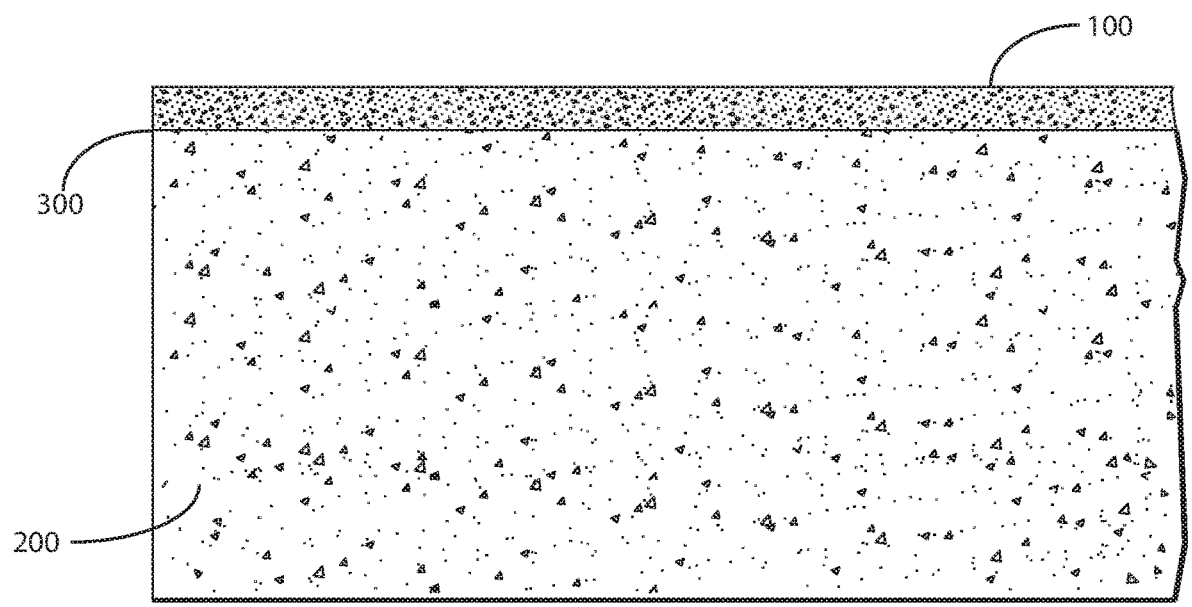
FIG. 3A illustrates a cross-sectional view of an exposed aggregate architectural coating applied over a roughened surface of an existing concrete structure, in accordance with the practice of exemplary embodiments of the present invention.

Turning now to the next figure, FIG. 3A illustrates a perspective cross-sectional view of the exposed aggregate architectural coating 100 applied over a roughened surface 300 of existing concrete structure 200. As may be appreciated in FIG. 3A, the architectural coating 100 is much thinner than the underlying pre-existing concrete structure 200. In one exemplary embodiment of the present invention, the architectural coating 100 when applied does not exceed a thickness of one-fourth of an inch. In another exemplary embodiment, the architectural coating 100 when applied, such as using the screeding method of application, may have a thickness of up to one-half of an inch. The architectural coating 100 is generally a thin aggregate layer applied over an existing concrete structure roughened surface 300; however, because of the particular composition of ingredients of which the aggregate architectural coating is comprised, as is more fully described below, architectural coating 100 forms a very durable and strong material, capable of withstanding heavy vehicular and pedestrian traffic for many years. The durable yet thin architectural coating 100, therefore, allows for the resurfacing of an existing, sound concrete structure 200, while alleviating the need for demolition of the much larger existing, sound concrete structure 200 and its internal structures in order to install a new concrete structure and surface having the industry-standard thickness, which is typically four inches or greater.

Figure 3B:
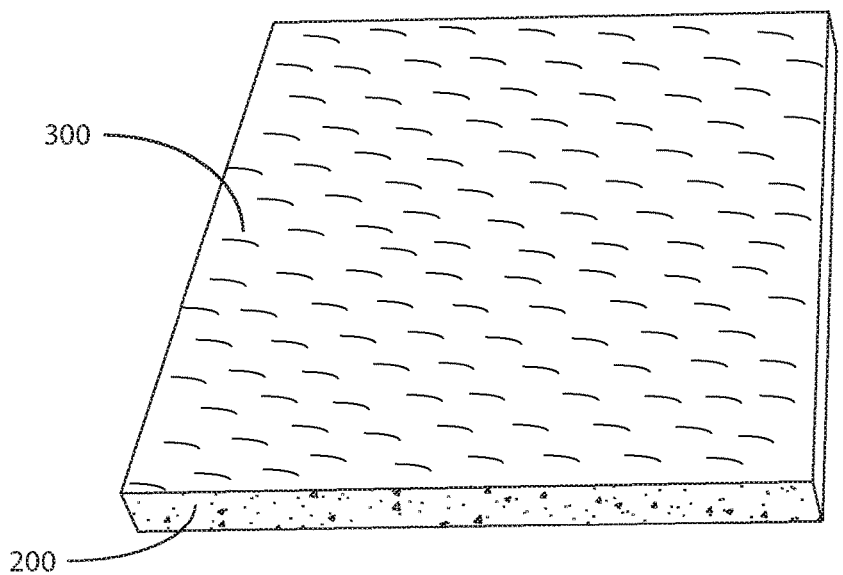
FIG. 3B illustrates a perspective cross-sectional view of a roughened surface of an existing concrete structure.

FIG. 3B illustrates a perspective cross-sectional view of the initial step in carrying out a method of the present invention according to an exemplary embodiment, comprising the preparation of the surface 300 of the pre-existing structurally-sound concrete structure 200.

Application of the exposed aggregate architectural coating necessitates preparation of the existing concrete surface 300. In an exemplary embodiment, the existing concrete structure 200 to be coated should initially be structurally sound. In an exemplary embodiment, this may necessitate that an existing surface 300 of concrete structure 200 having any damage should first be properly patched or repaired, such as where the exposed aggregate architectural coating will be applied using a gauge raking method (conversely, if the exposed aggregate architectural coating is being applied using the screeding method, pre-existing concrete structure surface damage may not have to be repaired). In yet another embodiment, this may necessitate that any cracks in the surface 300 be repaired. In yet another exemplary embodiment, any holes or pits in the structure 200 or concrete structure surface 300 should be filled, such as where the exposed aggregate architectural coating will be applied using a gauge raking method. Typically, in exemplary embodiments, all existing control joints and expansion joints in the existing surface 300 and concrete structure 200 should be respected and not damaged or compromised when roughening the concrete structure surface 300.

FIG. 4 depicts a block diagram of an overview of the process utilized for applying an exposed aggregate architectural coating in accordance with some exemplary embodiments of the present invention. More specifically, FIG. 4 depicts method 400 for applying an exposed aggregate architectural coating. Although method 400 is exemplarily shown with a series of steps in one particular sequence, method 400 may include fewer or more steps in alternative sequences without deviating from the scope of the present invention. As will be described in greater detail below, the process of applying the exposed aggregate architectural coating includes steps 401-408.

In step 401, the user should first prepare and roughen the existing concrete surface. In an exemplary embodiment, this will include removing debris and foreign surface material. In another exemplary embodiment, this will include repairing cracks, dips, holes, or other imperfections in the existing concrete structure, such as where the gauge raking method will be used to apply the exposed aggregate architectural coating. (In exemplary embodiments where the screeding method of application is used, "low spots" and other imperfections may not require repair before the exposed aggregate architectural coating may be applied, however, cracks do need to be repaired.) In step 401, the user should also roughen the surface of the pre-existing concrete structure. In an exemplary embodiment, this can be achieved by grinding the surface, or in another exemplary embodiment, by sand-blasting, shot-blasting, or any other suitable method of roughening a concrete surface.

In step 402, the user may prepare the exposed aggregate architectural coating composition by combining the specified ingredients in the appropriate proportions as described more fully below in FIGS. 5A and 5B, and in FIG. 7. This step may include mixing sand, such as silica sand or other sand material, and cement to form a "Part A" composition, then separately mixing glue and water to form a "Part B" composition, and then mixing both Part A and Part B together to form the material which will comprise the exposed aggregate architectural coating to be applied to a pre-existing concrete structure surface.

In step 403, the composition may be poured onto the roughened surface. In step 404, the coating composition may be spread to a desired thickness on the pre-existing concrete structure surface using a squeegee, a gauge raking technique, a screeding and/or rodding technique, or other suitable techniques. In an exemplary embodiment where the coating is being applied to a wall structure as opposed to a flooring structure, it may be desirable to use the spray method to apply the coating, for ease of application and in order to create a consistent surface thickness.

In step 405, if the exposed aggregate architectural coating is being applied to a flooring surface, the coated surface may be troweled using a trowel such as a "Fresno" trowel, a vibrating trowel, and/or weighted trowel. In an exemplary embodiment, this step may include using a vibrating trowel to create a smooth and uniform surface texture of the exposed aggregate architectural coating. In another exemplary embodiment, this step may include also using a weighted trowel to create a still smoother finish.

In step 406, after all trowel marks have been removed from the applied exposed aggregate architectural coating such that the applied coating has a smooth surface, a surface retarder may be applied. The surface retarder may be allowed to cure for twenty-four hours before being removed. However, in other exemplary embodiments, the user may choose not to apply a surface retarder, in order to create a smoother finish. Where a surface retarder has not been applied, or where a surface retarder was applied but did not achieve the desired surface texture, the user may wish to employ an "acid-washing" technique, to etch areas where the surface retarder did not perform well or to create a smoother etched finish, using etching material and/or detergents. Therefore, in exemplary embodiments, the user may employ the "acid-washing" technique to create a desired finish texture, and in other embodiments, the user may also employ an etching technique to create a desired finish texture.

In step 407, after the surface retarder has cured for twenty-four hours, the newly coated surface may then be pressure-washed such that the surface retarder is removed. In exemplary embodiments, the user may ensure that the surface retarder is fully removed from the exposed aggregate architecturally coated surface. In step 408, the user may use "acid-washing" on the coated surface to remove cement residue and laitance.

Turning now to FIG. 5A and FIG. 5B, tables are provided to more easily outline the ingredients comprising the exposed aggregate architectural coating, in their respective amounts and proportions. The exposed aggregate architectural coating is comprised of two parts: Part A, which contains a proportion of sand, such as silica sand or other sand material, and a proportion of cement; and Part B, which contains a proportion of glue, and a proportion of water. The amount of ingredients comprising each part will depend upon the surface to be coated, whether the surface is a floor or wall surface. The amount of ingredients will also be dependent upon the desired coating thickness, whether less than one-eighth of an inch, one-eighth, or one-fourth.

With respect to Part A, various types of sand may be combined to form a single exposed aggregate architectural surface coating. For example, in exemplary embodiments, types of sand of a particular coarseness and/or color may be combined. Combining multiple types of sand can create various desired textures, finishes, and appearances. In exemplary embodiments where the user desires to create a coating having less than one-eighth of an inch in thickness, a sand material should not exceed a coarseness of United States Sieve Size No. 20, which has a size of 0.841 millimeters; otherwise, achieving the desired thickness will typically not be possible. In other exemplary embodiments where the user desires to create a coating having one-eighth of an inch in thickness and up to one-fourth of an inch in thickness, a sand material should not exceed a coarseness of United States Sieve Size No. 16, which has a size of 1.19 millimeters; otherwise, achieving the desired thickness will typically not be possible. Aggregate materials of up to one-fourth of an inch in thickness can be broadcasted onto the surface of the exposed aggregate architectural coating.

As depicted in FIG. 5A, in exemplary embodiments where the user is seeking to coat a flooring surface wherein the coating will have a thickness of less than one-eighth of an inch, Part A will comprise a ratio of 14 parts sand to 16 parts cement, wherein a "part" may be any uniform measuring unit, such as pounds (lbs.) or quarts, depending upon the measurements of the surface area to be coated. In other words, the Part A composition will comprise a ratio of 7:8 sand to cement. However, also in exemplary embodiments where the user is seeking a coating having a thickness of less than one-eighth of an inch, Part A alternatively may comprise an amount of sand of up to 16 parts; therefore, in such embodiments, the ratio of sand to cement could be 16 parts sand to 16 parts cement, i.e. a ratio of 1:1. Therefore, the Part A composition may comprise an amount of sand within the range of 47 to 50 percent, and may comprise an amount of cement within the range of 50 to 53 percent.

Turning now to Part B, in exemplary embodiments where the user is seeking to coat a flooring surface wherein the coating will have a thickness of less than one-eighth of an inch, Part B will comprise a ratio of three parts water to one part glue, i.e. the Part B composition will comprise 75 percent water and 25 percent glue. One exemplary embodiment of the application method to create a thickness of less than one-eighth of an inch is by use of a squeegee.

In yet another exemplary embodiment where the user is seeking to coat a flooring surface wherein the coating will have a thickness of one-eighth of an inch, Part A will comprise a ratio of 14 parts sand to 16 parts cement, i.e. a ratio of 7:8 sand to cement. However, also in exemplary embodiments where the user is seeking a coating having a thickness of one-eighth of an inch, Part A alternatively may comprise an amount of sand of up to 16 parts; therefore, in such embodiments, the ratio of sand to cement could be 16 parts sand to 16 parts cement, i.e. a ratio of 1:1 sand to cement. Therefore, the Part A composition may comprise an amount of sand within the range of 47 to 50 percent, and may comprise an amount of cement within the range of 50 to 53 percent.

Turning now to Part B, in exemplary embodiments where the user is seeking to coat a flooring surface wherein the coating will have a thickness of one-eighth of an inch, Part B will comprise a ratio of three parts water to one part glue, i.e. the Part B composition will comprise 75 percent water and 25 percent glue. Multiple application methods may be employed to create a thickness of one-eighth of an inch, such as by use of a gauge rake, and/or by screeding, and/or rodding, and any other suitable methods of application.

In yet another exemplary embodiment where the user is seeking to coat a flooring surface wherein the coating will have a thickness of one-fourth of an inch, Part A will comprise a ratio of 14 parts sand to 20 parts cement. However, also in exemplary embodiments where the user is seeking a coating having a thickness of one-fourth of an inch, Part A alternatively may comprise an amount of sand of up to 22 parts, and may comprise an amount of cement of up to 28 parts; therefore, in such embodiments, the ratio of sand to cement could be between 14 parts sand to 20 parts cement, and 22 parts sand to 28 parts cement, i.e. between the reduced ratios of 7:10 sand to cement, and 11:14 sand to cement. Therefore, the Part A composition may comprise an amount of sand within the range of 41 to 44 percent, and may comprise an amount of cement within the range of 56 to 59 percent.

Turning now to Part B, in exemplary embodiments where the user is seeking to coat a flooring surface wherein the coating will have a thickness of one-fourth of an inch, Part B will comprise a ratio of three parts water to one part glue, i.e. the Part B composition will comprise 75 percent water and 25 percent glue. Multiple application methods may be employed to create a thickness of one-fourth of an inch, such as by use of a gauge rake, and/or by screeding, and/or rodding, or any other suitable methods of application.

As depicted in FIG. 5B, in exemplary embodiments where the user is seeking to coat a wall surface wherein the coating will have a thickness of less than one-eighth of an inch, Part A will comprise a ratio of 14 parts sand to 16 parts cement, wherein a "part" may be any uniform measuring unit, such as pounds (lbs.) or quarts, depending upon the measurements of the surface area to be coated. In other words, the Part A composition will comprise a ratio of 7:8 sand to cement. However, also in exemplary embodiments where the user is seeking a coating having a thickness of less than one-eighth of an inch, Part A alternatively may comprise an amount of sand of up to 16 parts; therefore, in such embodiments, the ratio of sand to cement could be 16 parts sand to 16 parts cement, i.e. a ratio of 1:1. Therefore, the Part A composition may comprise an amount of sand within the range of 47 to 50 percent, and may comprise an amount of cement within the range of 50 to 53 percent.

Turning now to Part B, in exemplary embodiments where the user is seeking to coat a wall surface wherein the coating will have a thickness of less than one-eighth of an inch, Part B will comprise a ratio of six parts water to one part glue, i.e. the Part B composition will comprise approximately 86 percent water and 14 percent glue.

Where the user desires to create a wall coating having less than one-eighth of an inch in thickness, a sand material should not exceed a coarseness of United States Sieve Size No. 20, which has a size of 0.841 millimeters; otherwise, achieving the desired thickness will typically not be possible. In other exemplary embodiments where the user desires to create a coating having one-eighth of an inch in thickness and up to one-fourth of an inch in thickness, a sand material should not exceed a coarseness of United States Sieve Size No. 16, which has a size of 1.19 millimeters; otherwise, achieving the desired thickness will typically not be possible. Aggregate materials of up to one-fourth of an inch in thickness can be broadcasted onto the surface of the exposed aggregate architectural coating.

In an exemplary embodiment, application of the exposed aggregate architectural coating to a wall surface could be achieved by spraying the coating material onto the wall surface. Such a method may be desirable so that the coating is applied in a uniform consistency throughout the wall surface, which consistency may be more easily achieved by the spray method. A float method can also be used in addition to the spray method, in order to create an entirely flat consistency of coating upon a wall surface.

In exemplary embodiments where the user is seeking to coat a wall surface wherein the coating will have a thickness of one-eighth of an inch, Part A will comprise a ratio of 14 parts sand to 16 parts cement. In other words, the Part A composition will comprise a ratio of 7:8 sand to cement. However, also in exemplary embodiments where the user is seeking a coating having a thickness of one-eighth of an inch, Part A alternatively may comprise an amount of sand of up to 16 parts; therefore, in such embodiments, the ratio of sand to cement could be 16 parts sand to 16 parts cement, i.e. a ratio of 1:1. Therefore, the Part A composition may comprise an amount of sand within the range of 47 to 50 percent, and may comprise an amount of cement within the range of 50 to 53 percent.

Turning now to Part B, in exemplary embodiments where the user is seeking to coat a wall surface wherein the coating will have a thickness of one-eighth of an inch, Part B will comprise a ratio of six parts water to one part glue, i.e. the Part B composition will comprise approximately 86 percent water and 14 percent glue. In an exemplary embodiment where the user is seeking to coat a wall surface wherein the coating will have a thickness of one-eighth of an inch, application of the exposed aggregate architectural coating to a wall surface could be achieved by spraying the coating material onto the wall surface, in order to more easily achieve a uniform consistency throughout the wall surface. A float method can also be used in addition to the spray method, in order to create an entirely flat consistency of coating upon a wall surface.

Application of the exposed aggregate architectural coating to a wall surface typically will not exceed a thickness of one-eighth of an inch, due to the weight of the material. However, in exemplary embodiments where the user is seeking to coat a wall surface wherein the coating will have a thickness of one-fourth of an inch, Part A will comprise a ratio of 14 parts sand to 20 parts cement. Also in exemplary embodiments where the user is seeking a wall coating having a thickness of one-fourth of an inch, Part A alternatively may comprise an amount of sand of up to 22 parts, and may comprise an amount of cement of up to 28 parts; therefore, in such embodiments, the ratio of sand to cement could be between 14 parts sand to 20 parts cement, and 22 parts sand to 28 parts cement, i.e. between the ratios of 7:10 sand to cement, and 11:14 sand to cement. Therefore, the Part A composition may comprise an amount of sand within the range of 41 to 44 percent, and may comprise an amount of cement within the range of 56 to 59 percent.

Turning now to Part B, in exemplary embodiments where the user is seeking to coat a wall surface wherein the coating will have a thickness of one-fourth of an inch, Part B will comprise a ratio of six parts water to one part glue, i.e. the Part B composition will comprise approximately 86 percent water and 14 percent glue.

As is described more fully below, Part A and Part B will be combined and mixed together to form the exposed aggregate architectural coating, which will be applied over an existing concrete structure surface.

Cement surfacing compositions typically contain a ratio of three parts sand to one part cement (ratio of 3:1 sand to cement). However, in an exemplary embodiment of the present invention, the ratio of sand to cement is greatly modified, such that there is a much greater amount of cement than in typical industry-standard compositions. In the present invention, exemplary embodiments typically will contain a ratio of 14 parts sand to 16 parts cement, or 14 parts sand to 20 parts cement, or 16 parts sand to 16 parts cement.

An exemplary embodiment will employ use of a very strong and durable glue material, such as "S-1100 Liquid Concentrate" polymer glue, in the Part B component. For this reason, a greater amount of cement is capable of being utilized in the Part A component, as compared the above-described, industry-standard cement coating compositions having a ratio of 3:1 sand to cement. The resultant exposed aggregate architectural coating is therefore extremely durable and capable of withstanding high amounts of pedestrian and vehicular traffic for many years, while having a thickness of only one-fourth of an inch or less, as compared to the industry standard cement surfaces and structures requiring a thickness of at least four inches.

Such a composition results in an unexpectedly durable and strong cement-based coating material, capable of withstanding heavy vehicular and pedestrian traffic for many years, while still having a thickness of only one-fourth of an inch or less, as opposed to the industry standard four-inch or greater thickness for cement-based coatings. The durable yet thin exposed aggregate architectural coating of the present invention, therefore, allows for the resurfacing of an existing, sound concrete structure, while alleviating the need for demolition of the existing, sound concrete structure and its internal structures in order to install a new concrete structure and surface having the industry-standard thickness of four inches or greater.

The reduced thickness of the present invention also allows for a reduction in the cost of manufacture and application of the coating material, and a reduction in the effort required to be expended in the application of the coating material. Additionally, the reduced thickness of the present invention as opposed to industry-standard cement surfacing allows for greater flexibility in decorative and design choices: as described above, white cement which is typically expensive can be much more liberally employed with the present invention. Also, as will be described more fully below in FIG. 8, the broadcasting process of creating surface designs having exposed materials such as glass, sea shells, and other decorative materials, is much more simplified, and waste of broadcasted material is greatly reduced.

Figure 6:
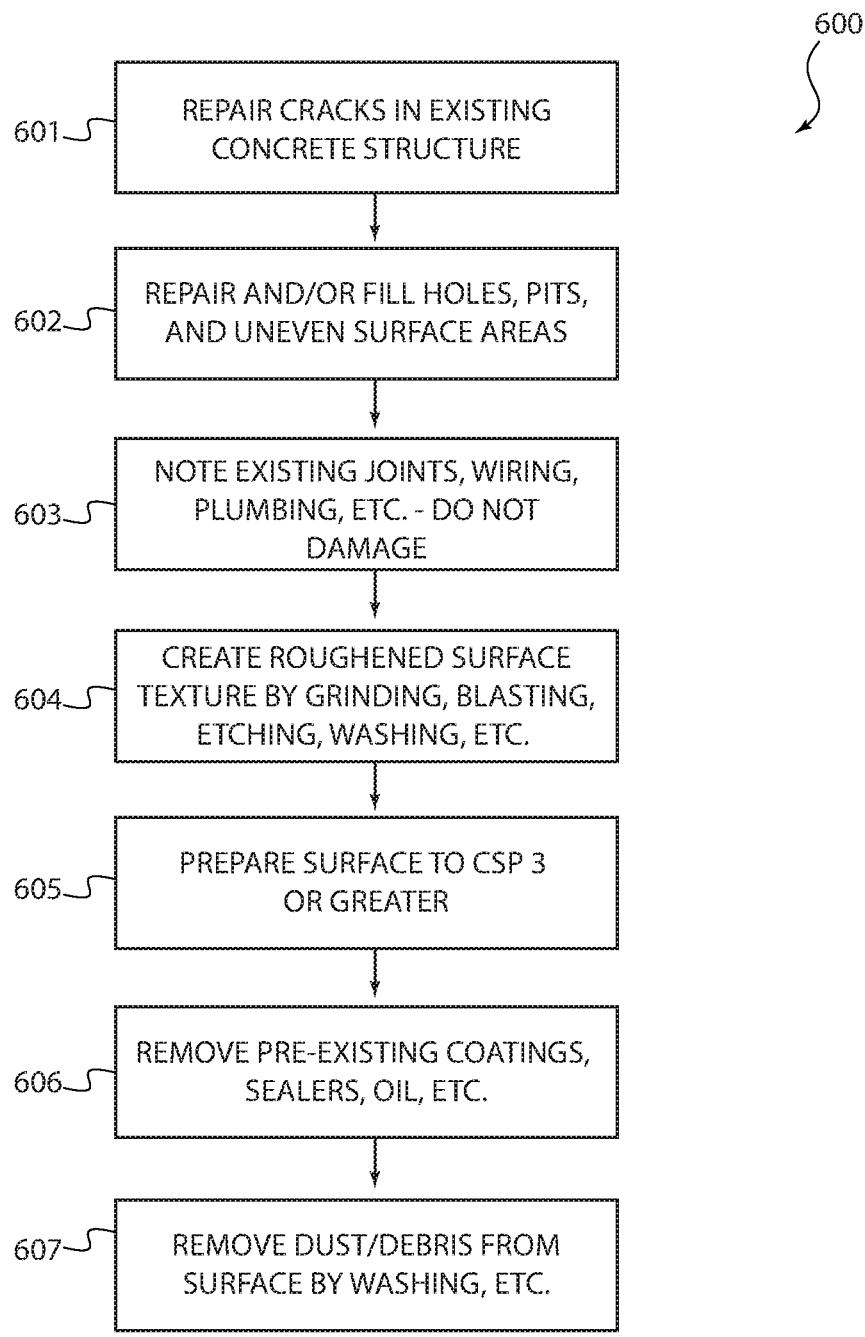
FIG. 6 illustrates a block diagram of the process utilized for preparing and roughening the pre-existing concrete structure surface.

With reference to FIG. 6, the initial step in carrying out the method of the present invention according to an exemplary embodiment is depicted. More specifically, FIG. 6 depicts method 600 for preparing and roughening an existing concrete structure surface. Although method 600 is exemplarily shown with a series of steps in one particular sequence, method 600 may include fewer or more steps in alternative sequences without deviating from the scope of the present invention. As will be described in greater detail below, the process of applying the exposed aggregate architectural coating includes steps 601-607.

Method 600 for preparing and roughening the existing concrete surface depicts the process for the preparation of the surface of the pre-existing structurally-sound concrete structure. Installation of the exposed aggregate architectural coating necessitates preparation of the existing concrete structure surface. The existing concrete structure to be coated should initially be structurally sound. This may require carrying out step 601, that an existing concrete structure surface having any damage should first be properly patched, and any cracks in the surface should be repaired. Step 602 may require that any holes, dips, pits, or uneven surface texture areas in the underlying concrete structure or its surface should be filled and/or repaired, such as where the gauge raking method will be used to apply the exposed aggregate architectural coating (alternatively, in embodiments where the screeding method will be utilized to apply the exposed aggregate architectural coating, then holes, dips, pits, or other uneven surface texture areas do not first need to be repaired). Step 603 may require that all existing control joints, expansion joints, and any wiring, plumbing, or other structures in the existing surface and underlying concrete structure to be respected and not damaged or compromised when roughening and preparing the concrete structure surface.

To prepare the surface of the pre-existing concrete structure for application of the exposed aggregate architectural coating, step 604 would require that a roughened surface texture in the pre-existing concrete structure surface be created, by use of a number of different surface-preparation techniques. In exemplary embodiments, the roughened surface texture can be created by grinding the pre-existing concrete structure surface. In another exemplary embodiment, the roughening can be created by sandblasting. In yet another exemplary embodiment, the roughening can be created by using the "acid-washing" technique, which employs etching material and/or detergents. In yet another exemplary embodiment, the roughening can be created by chemically etching and shot-blasting of the pre-existing concrete structure surface. Other suitable techniques may also be used to create a roughened surface texture in the concrete structure surface.

In an exemplary embodiment, step 605 may be carried out, which would require that the existing concrete structure surface be mechanically prepared to a concrete surface profile ("CSP") of three or greater, in order to ensure that any surface contaminants are removed before the architectural coating is applied. In another exemplary embodiment, step 606 may be carried out, which would require that any pre-existing coatings, curing compounds, sealers, oil, or any bond-breakers previously applied to the existing concrete surface to first be removed in preparation for application of the architectural coating. Such pre-existing materials may be removed by pressure-washing, the "acid-washing" technique employing etching material and/or detergents, or other suitable method.

In exemplary embodiments, step 607 may be carried out, wherein the user may also ensure to thoroughly remove dust or other debris from the concrete surface area to be coated, such as by vacuuming, sweeping, or pressure-washing, or other suitable method for removing unwanted particles from a cement surface. In an exemplary embodiment, preparation of the concrete surface necessitates that the surface is cleaned, with any loose debris being removed from the roughened surface. It is an advantage of the present invention that, due to the composition of the exposed aggregate architectural coating material, a primer is not needed to be applied to the pre-existing concrete structure surface before the exposed aggregate architectural coating can be applied.

Figure 7:
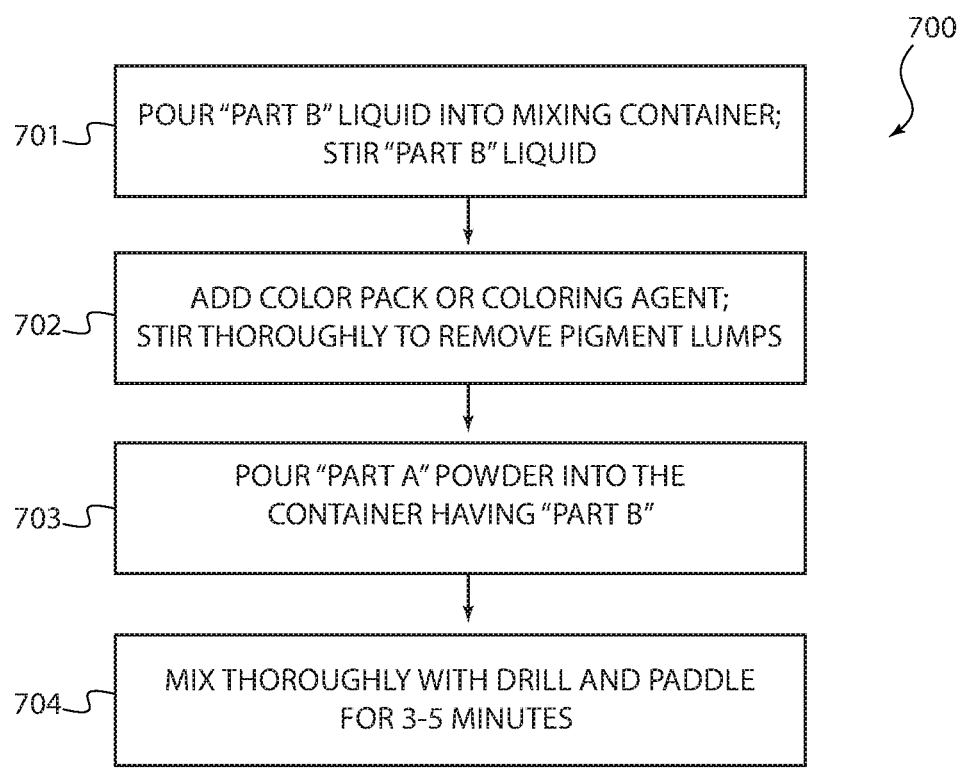
FIG. 7 depicts a block diagram of the process utilized for preparing the exposed aggregate architectural coating composition.

FIG. 7 illustrates the process for preparing the exposed aggregate architectural coating composition. FIG. 7 depicts method 700 for preparing the exposed aggregate architectural coating composition. Although method 700 is exemplarily shown with a series of steps in one particular sequence, method 700 may include fewer or more steps in alternative sequences without deviating from the scope of the present invention. As will be described in greater detail below, the process of applying the exposed aggregate architectural coating includes steps 701-704.

To prepare the exposed aggregate architectural coating composition that will be applied to an existing surface to form the exposed aggregate architectural coating, a two-part composition comprised of "Part A" and "Part B," having the ingredients and proportions described above in FIGS. 5A and 5B, should be created.

Initially as a first step 701, Part B, which comprises a composition of glue and water, should be poured into a mixing container of an appropriate size for the user's needs, dependent upon the measurements of the surface area to be coated. Part B of the exposed aggregate architectural coating composition is a combination of glue and water, in the amounts as depicted in FIGS. 5A and 5B. An exemplary embodiment can employ the use of a very strong and durable glue material, such as "S-1100 Liquid Concentrate" polymer glue, in the Part B component. In exemplary embodiments where the user desires to apply the exposed aggregate architectural coating to a flooring surface, Part B should contain a ratio of three parts water to one part glue (ratio of 3:1), a "part" being any uniform measuring unit, e.g. pounds (lbs.) or quarts. In exemplary embodiments where the user desires to apply the exposed aggregate architectural coating to a wall surface, Part B should contain a ratio of six parts water to one part glue (ratio of 6:1).

In exemplary embodiments, step 702 may be carried out, which would require that, if desired, an integral color pack or other suitable cement coloring method may be added to liquid Part A to change the color of the architectural coating to any desired color, for aesthetic purposes, or can also be added during the mixing process as an optional "Part C" component. In exemplary embodiments, the user may lightly mix the color pack or other coloring material with liquid Part B, in order to break up any color pigment lumps within the color pack.

For step 703, Part A, which comprises a composition of sand and cement, should be prepared and then poured into the container having Part B. The user should determine which types of sand will be combined to form Part A. In exemplary embodiments, the user may combine multiple types of sand having various degrees of coarseness and various colors, in order to create an end result having a desired texture and design, once the architectural coating has been fully applied. Due to the architectural coating forming a thin layer of one-fourth of an inch or less upon an existing concrete structure surface, a user may make more liberal use of more expensive sand and cement materials and finishes, such as using white cement to create a white floor or wall surface.

In an exemplary embodiment, the proportions of sand to cement in Part A, as shown in FIGS. 5A and 5B, however, should be respected, notwithstanding use of various types of sand. Additionally, in exemplary embodiments where the user seeks to create a coating having a thickness of less than one-eighth of an inch, the user should not use a sand having a coarseness greater than United States Sieve Size No. 20, which has a size of 0.841 millimeters; otherwise, achieving the desired thickness will typically not be possible. In other exemplary embodiments where the user desires to create a coating having one-eighth of an inch in thickness and up to one-fourth of an inch in thickness, a sand material should not exceed a coarseness of United States Sieve Size No. 16, which has a size of 1.19 millimeters; otherwise, achieving the desired thickness will typically not be possible.

In an exemplary embodiment where the user seeks to create a coating having a thickness of less than one-eighth of an inch, the user may use, for example, a combination of sand size no. 20, no. 30, and no. 60, to achieve a particular sand finish and texture. However, in other exemplary embodiments where the user seeks to create a coating having a thickness of less than one-eighth of an inch, the user should not use a sand material having a coarseness of United States Sieve Size No. 16, which has a size of 1.19 millimeters, as this will prevent the user from being able to create a coating having the desired thickness of less than one-eighth of an inch.

To illustrate various Part A compositions which can be employed in exemplary embodiments, three possible compositions will now be described. In the first exemplary embodiment where the user desires to create an exposed aggregate architectural coating having a thickness of less than one-eighth of an inch, the Part A composition may contain: eight pounds (lbs.) of Silica sand size no. 20, four pounds of Silica sand size no. 30, four pounds of Silica sand size no. 60, or may substitute another type of sand material, and sixteen pounds of cement, for a total of thirty-two pounds. Such a composition, while having a unique combination of silica sand types in order to meet creative and design needs, still respects the ratio of 14 parts sand to 16 parts cement as depicted in FIGS. 5A and 5B where a coating having less than one-eighth inch thickness is desired.

In similar exemplary embodiments, the amount of ingredients may be increased, while maintaining the same ratio, such as to apply an exposed aggregate architectural coating to a larger surface area; for example, the same composition may combine 12.5 pounds of Silica sand size no. 20, 6.25 pounds Silica sand size no. 30, 6.25 pounds of Silica sand size no. 60, and 25 pounds of cement, for a total of fifty pounds.

Additionally, in such a composition the coarseness of sand should not exceed United States Sieve Size No. 20, which has a size of 0.841 millimeters, in order to create the desired less than one-eighth inch thickness.

In the second exemplary embodiment where the user desires to create an exposed aggregate architectural coating having a thickness of one-eighth of an inch, the Part A composition may contain: eight pounds (lbs.) of Silica sand size no. 16, four pounds of Silica sand size no. 20, four pounds of Silica sand size no. 30, or may substitute another sand material, and sixteen pounds of cement, for a total of thirty-two pounds. Such a composition, while having a unique combination of silica sand types in order to meet creative and design needs, still respects the ratio of 14 parts sand to 16 parts cement as depicted in FIGS. 5A and 5B where a coating having a one-eighth inch thickness is desired.

In similar exemplary embodiments, the amount of ingredients may be increased, while maintaining the same ratio, such as to apply an exposed aggregate architectural coating to a larger surface area; for example, the same composition may combine 12.5 pounds of Silica sand size no. 16, 6.25 pounds Silica sand size no. 20, 6.25 pounds of Silica sand size no. 30, and 25 pounds of cement, for a total of 50 pounds.

In the third exemplary embodiment where the user desires to create an exposed aggregate architectural coating having a thickness of one-fourth of an inch, the Part A composition may contain: eight pounds (lbs.) of Silica sand size no. 16, four pounds of Silica sand size no. 20, four pounds of Silica sand size no. 30, or may substitute another sand material, and 20 pounds of cement, for a total of thirty-six pounds. Such a composition, while having a unique combination of silica sand types in order to meet creative and design needs, still respects the ratio of 14 parts sand to 20 parts cement as depicted in FIGS. 5A and 5B where a coating having a one-fourth inch thickness is desired.

In similar exemplary embodiments, the amount of ingredients may be increased, while maintaining the same ratio, such as to apply an exposed aggregate architectural coating to a larger surface area; for example, the same composition may combine 11.11 pounds of Silica sand size no. 16, 5.56 pounds Silica sand size no. 20, 5.56 pounds of Silica sand size no. 30, and 27.78 pounds of cement, for a total of approximately 50 pounds.

If any materials have "settled" such that they are no longer uniformly mixed due to lengthy storage, these materials should first be stirred to a uniform consistency, such as with a "Jiffy" mixer, before being mixed with any other material. For example, if the sand and cement have been previously mixed and held in storage, the sand and cement may have separated and may need to be stirred first before being used to create the Part A and Part B exposed aggregate architectural coating composition.

If a stiffer consistency is desired for the architectural coating end result, the amount of Part A liquid to be added to the composition can be reduced. Conversely, if a more fluid consistency is desired, the amount of Part A liquid to be added into the composition can be increased. The ratio of Part A to Part B liquid should not exceed 3.5 to 6 quarts of Part A liquid per 50-pounds (lbs.) of Part B liquid.

The user then may slowly add Part A into the above mixing container having Part B. To carry out step 704, the user may mix both parts thoroughly with a drill and paddle, such as a helical mixing paddle. The user may mix the components for three to five minutes until the composition is smooth and free of lumps or solid portions. A composition that has entrapped a large amount of air, e.g. having numerous air bubbles, may be mixed more thoroughly to remove the trapped air.

Figure 8:
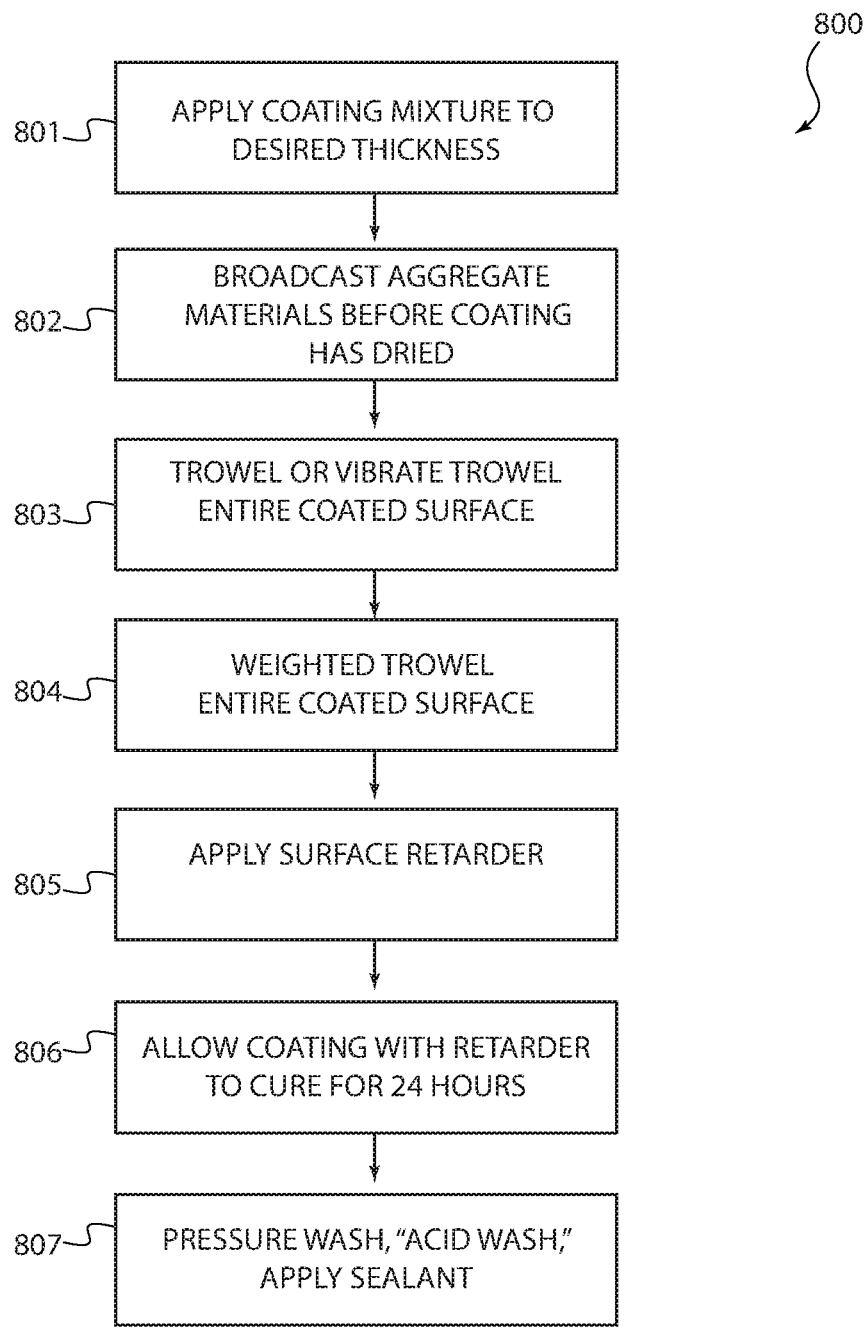
FIG. 8 depicts a block diagram of the detailed process utilized for applying the exposed aggregate architectural coating to a flooring structure.

FIG. 8 depicts in detail the process for application of the exposed aggregate architectural coating to a flooring surface. FIG. 8 depicts method 800 for applying the exposed aggregate architectural coating to a flooring surface. Although method 800 is exemplarily shown with a series of steps in one particular sequence, method 800 may include fewer or more steps in alternative sequences without deviating from the scope of the present invention. As will be described in greater detail below, the process of applying the exposed aggregate architectural coating to a flooring surface includes steps 801-808.

To carry out step 801, once the exposed aggregate architectural coating composition has been prepared, where a thickness of less than one-eighth of an inch is desired, the exposed aggregate architectural coating can be poured onto the surface to be coated, and can be spread using a squeegee, such as specifically an industrial floor squeegee having a rubber blade. In exemplary embodiments where the user seeks to create a coating of less than one-eighth of an inch in thickness, the user can alternatively use a magic trowel to spread the coating to a desired thickness, wherein the "Magic" trowel is similar to a squeegee having a flexible blade.

A desired exposed aggregate architectural coating thickness of one-eighth of an inch requires that the poured coating is spread using a gauge rake tool in the size of approximately 3/16", where screeding (use of a floor screed, i.e. a commercial cementitious material combining a ratio of cement and sand, can be employed as a smoothing and leveling aid if needed) and/or rodding (using a rod to smoothen the exposed aggregate architectural coating composition so as to create the desired thickness) can also be employed, which will result in a #3 or #5 etching degree. A thickness of one-fourth of an inch requires application by a gauge rake in the size of approximately 5/16", where screeding and/or rodding can also be employed, which will result in an exposed aggregate finish. Gauge raking, screeding, and rodding are all appropriate methods for applying and spreading the coating composition.

In an exemplary embodiment of the present invention, the user may wish to carry out step 802, in which the user may employ a broadcasting procedure to create a customized exposed aggregate architectural coating texture, finish, and/or appearance, to meet creative and design needs. Immediately following the pour and spreading of the architectural coating material using either a squeegee, gauge rake, or other method, the user can perform the broadcasting procedure to broadcast aggregate materials of various types into the exposed aggregate architectural coating. The materials to be broadcasted can include glass, sea shells, plastic including recycled plastic particles, or any other material suitable for decorative flooring or wall structures. In exemplary embodiments, the aggregate materials to be broadcasted are applied on top of the architectural coating immediately after the coating has been applied, and before the coating has dried. The aggregate materials are then buried into the exposed aggregate architectural coating composition, i.e. submerged into the exposed aggregate architectural coating such that the broadcasted aggregate materials are completely encased by the exposed aggregate architectural coating, such that a smooth finish is created having an even and smooth top layer, but in which the aggregate materials having been broadcasted will still be visible once the surface retarder and top layer of the exposed aggregate coating have been removed.

Exemplary embodiments of the present invention result in an architectural coating having a thickness of one-fourth, or one-half of an inch or less, as opposed to the industry-standard minimum of four inches, resulting in the amount of broadcasted aggregate materials applied over the architectural coating being greatly reduced, further resulting in a much more cost-efficient surface-restoration process. Additionally, the amount of architectural coating required to bury the broadcasted aggregates is also reduced, while still maintaining a consistent exposed aggregate finish, as opposed to the industry-standard requirement and practice, due to the exposed aggregate architectural coating being applied to form a thin layer that cannot result in the broadcasted aggregates being buried to the point of invisibility. The present invention is therefore much more cost-efficient than similar industry-standard practices, employs a smaller quantity of materials, results in much less waste of materials, and employs an easier application method with a more aesthetically pleasing end result than similar industry-standard practices.

According to step 803, once the coating material has been evenly spread to the desired thickness, having a uniform consistency as shown in FIG. 1, and once the broadcasted aggregates (e.g. glass) have been applied if desired, the user should trowel the surface, such as by using a vibrating trowel, in order to bring cement cream to the surface, and to remove any gauge or screed marks. The user should vibrating trowel the surface, e.g. using a "Fresno" vibrating trowel, or can also employee use of a standard trowel, such that the coating layer is as smooth as possible, leaving minimal trowel marks. If troweling is exceedingly difficult due to the stickiness of the glue, the user may apply a water mist as a layer between the architectural coating and the trowel, such that the trowel may glide over the coating more easily. The user may opt to trowel the coated surface a second time, and even a third time, depending on the desired surface texture and finish.

The user can, in addition or alternatively, in accordance with step 804, apply a weighted trowel, such as a weighted "Fresno" trowel, to the entire coated surface, using a minimum of two weights, in order to remove any trowel marks from the initial trowel passes, and to create a uniformly smooth surface. The user should ensure that no trowel marks are left after this final weighted trowel pass. Other suitable troweling techniques may also be utilized to facilitate the creation of a uniform smooth surface. Water can be lightly misted onto the coated surface, as a finishing aid. If the user has elected to broadcast aggregate materials, e.g. glass, into the exposed aggregate architectural coating, the user should be sure not to damage the broadcasted aggregates during the troweling process.

The user may perform a finger-print test to determine if the coating material has cured, by touching the coated surface with one finger. If only fingerprints are left behind and the coated surface cannot be depressed, the user can then perform step 805 of applying a surface retarder. (Alternatively, in one exemplary embodiment, the user may choose not to apply a surface retarder to the coated surface, to produce a smoother, light-exposed aggregate coated surface. If no surface retarder is used, the exposed aggregate architectural coating should nonetheless be left to cure for twenty-four hours.) It is important that the surface retarder is not applied until the exposed aggregate architectural coating has cured, as determined by the above-described fingerprint test. This fingerprint test method for determining if a cement surface has cured is unique to the present invention; while typically those skilled in the art determine if a cement surface coating has cured simply by observing the appearance of the coating, a fingerprint test is utilized here, because of the uniqueness of the appearance and texture of the exposed aggregate architectural coating material.

Once the user has employed the fingerprint test to determine that the coating has cured, the user can then apply a chemical surface retarder to the coated surface as per step 805, uniformly covering the entire architectural coating with the surface retarder. The user can apply the user's preferred surface retarder, at the desired finish (in exemplary embodiments, retarder #1, #3, or #5 can be used for a sanded finish, and retarder #15 or greater should be used for an exposed aggregate finish). The user should be sure to cover the entire coated surface with the surface retarder. If during the application of the surface retarder, areas of the coating have dried faster than others, the user may employ an "acid-washing" technique using etching material or detergents to etch the coating that has dried to ensure that all areas of the coating are uniform in consistency. Alternatively and in other embodiments, etching material can be utilized throughout the application process to create a consistent finish and exposure.

To perform step 806, the chemical surface retarder should be left to cure on the coated surface for twenty-four hours. The user should allow the coating material with the applied surface retarder to stiffen and cure over time, typically for twenty-four hours. (When performing a squeegee application such that a light acid-wash finish is desired, the user should allow the coating material to stiffen and cure for a minimum of twenty-four hours).

To perform step 807, in exemplary embodiments, the user may then wash off the surface retarder after twenty-four hours have elapsed, such as by utilizing a pressure washer with a rotary surface cleaner attachment. After at least twenty-four hours have elapsed and the desired finish has been attained, the user may pressure-wash the newly coated surface to the desired uniform finish, removing any cement residue or laitance, using etching material if needed to clean the surface thoroughly; the user may also employee laitance washing as needed. Other suitable techniques for removal of the surface retarder may be utilized to remove the surface retarder after twenty-four hours have elapsed since its application.

The user should then wait another twenty-four hours after the surface has been pressure-washed. The user then should employee "acid-washing" to the coated surface using etching material and/or detergents. In an exemplary embodiment, the user can apply etching material to create a light acid-wash finish if desired. In an exemplary embodiment, after the surface retarder has been removed, or if the user has elected not to apply a surface retarder, the user can etch the newly-coated surface to a desired texture, such as by acid-washing or chemically etching the smooth surface. If the user has elected to apply a surface retarder, then a minimum of twenty-four hours should elapse, after which the remaining cement residue or laitance can be removed, such as by acid-washing or by chemically etching the surface. The resultant architectural coating will result in a durable, consistent exposed aggregate finish, having a thickness of less than one-fourth of an inch.

Additionally, in an exemplary embodiment of the present invention, the user may seal the architectural coating using a manufactured sealant, following the manufacturer's instructions and recommendations for use of the sealant. In exemplary embodiments where the exposed aggregate architectural coating has been applied indoors, the user may also use a polishing machine on the exposed aggregate architecturally coated surface to create a smooth finish resembling the material of polished concrete and/or terrazzo.

Figure 9:
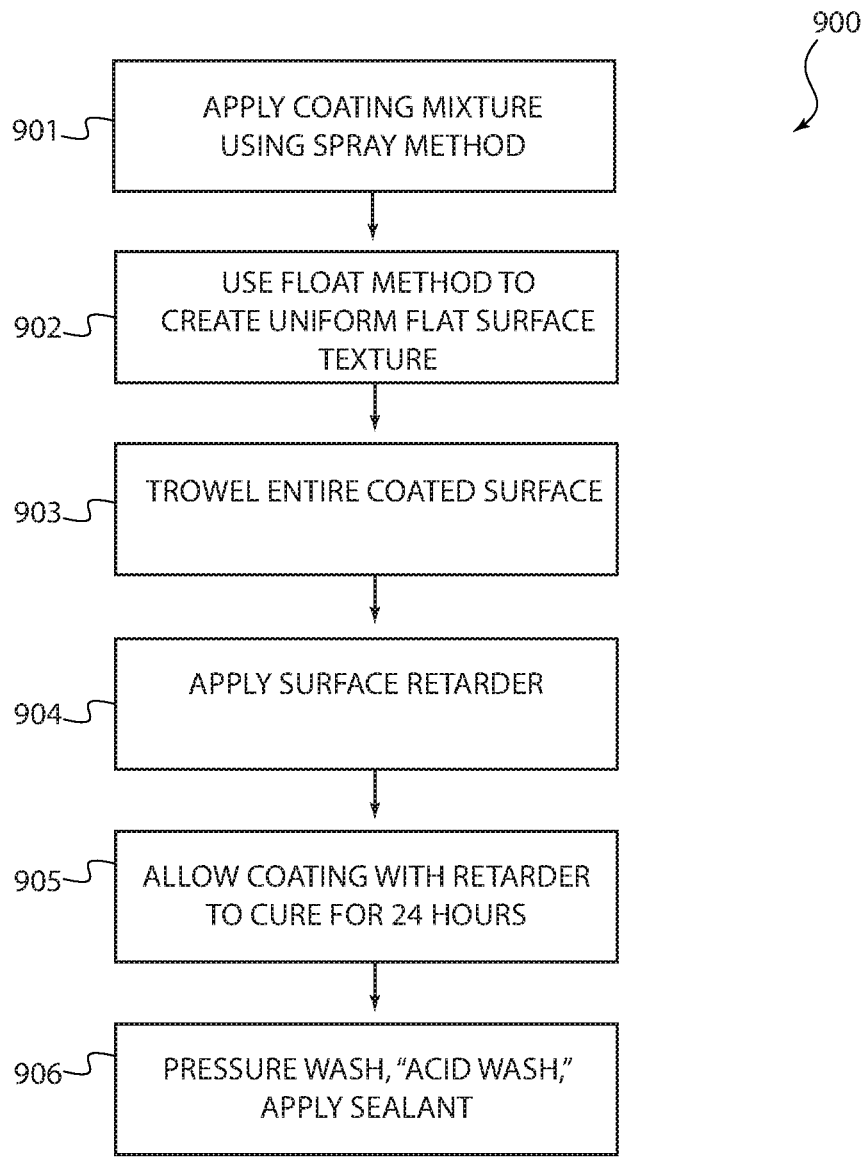
FIG. 9 illustrates a block diagram of the detailed process utilized for applying the exposed aggregate architectural coating to a wall structure.

FIG. 9 depicts in detail the process for application of the exposed aggregate architectural coating surface to a wall surface. FIG. 9 depicts method 900 for applying the exposed aggregate architectural coating to a wall surface. Although method 900 is exemplarily shown with a series of steps in one particular sequence, method 900 may include fewer or more steps in alternative sequences without deviating from the scope of the present invention. As will be described in greater detail below, the process of applying the exposed aggregate architectural coating to a wall surface includes steps 901-908.

The process of applying the exposed aggregate architectural coating to a wall surface will be similar to the process of application for a flooring surface. The wall surface should first be prepared and roughened in accordance with the method outlined in FIG. 6, just as is done when the coating is to be applied to a flooring surface. However, unlike the procedure for coating a flooring surface, here the user should carry out step 901 of applying the exposed aggregate architectural coating material to the desired thickness using the spray method. In exemplary embodiments, using the spray method to apply the architectural coating may be desired, so that the applied coating has a uniform consistency throughout, and is not over-applied in some areas and under-applied in others. Where the desired coating thickness is thinner, such as in exemplary embodiments where a one-eighth inch thickness is desired, it will be particularly beneficial to use the spray method, as achieving a thin coating by another method is likely to be challenging. When applying the coating to a wall surface, step 902 necessitates use of the float method, used to create a uniformly flat surface for a wall coating, which typically involves use of a leveling cement mortar applied according to the manufacturer's specifications.

The remaining procedure for application of the coating to a wall surface will resemble the flooring application procedure. For step 903, after the float method has been employed, the user may then trowel the entire coated surface to create a smooth finish. To perform step 904, the exposed aggregate architectural coating should be left to cure and harden for twenty-four hours. If desired, prior to leaving the exposed aggregate architectural coating to cure and harden for twenty-four hours, the fingerprint test described above may be employed to ensure that the coating has adequately hardened, and if so, then a surface retarder may be applied. The surface retarder may be applied according to the manufacturer's specifications, and according to the user's desired surface texture.

After yet another twenty-four hours have elapsed, the user may perform step 906, in which the surface retarder is washed away using a pressure-wash, and the coated surface is then "acid-washed" using etching material and/or detergents to remove cement residue and laitance and create a desired texture; laitance washing therefore can also be employed as necessary. In exemplary embodiments, according to the user's preference, the user may apply a commercial sealant to the coated surface according to the manufacturer's specifications. In exemplary embodiments where the exposed aggregate architectural coating has been applied indoors, the user may also use a polishing machine on the exposed aggregate architecturally coated surface to create a smooth finish resembling the material of polished concrete and/or terrazzo.

Weather conditions may affect the installation of the exposed aggregate architectural coating. Hot weather, such as environmental temperatures above 75° F. (23° C.), may speed up the time in which the coating is cured. Therefore, when hot weather conditions are anticipated during application of the architectural coating, the user should keep the coating material cool by using chilled water when preparing the initial Part A and Part B exposed aggregate architectural coating composition. The user also should follow American Concrete Institute ("ACI") Committee publication 305, "Specification for Hot Weather Concreting."

Conversely, cold weather conditions will also affect the installation of the exposed aggregate architectural coating. Environmental temperatures below 60° F. (15° C.) may delay the setting time and thereby require longer than twenty-four hours for the coating to fully cure. In such conditions, the user may need to reduce the surface retarder strength, or wash the coating without a rotary attachment. In such cold weather conditions, the user should attempt to keep the architectural coating material warm, by using heated water when preparing the initial Part A and Part B exposed aggregate architectural coating composition. The user also should follow American Concrete Institute ("ACI") Committee publication 306, "Guide to Cold Weather Concreting."

Generally, the exposed aggregate architectural coating material should be applied only when surface temperatures are above 55° F. and rising, and not expected to exceed 100° F. Furthermore, the coating should not be applied when precipitation is expected to occur within twenty-four hours following completion of the application. If the exposed aggregate architectural coating part A and part B have been separately mixed and placed in storage for use at a later date, the user should not allow the exposed aggregate architectural coating material to freeze during storage. Once part A and part B are mixed together, the mixture will begin to harden immediately, and therefore should be applied to a pre-existing concrete structure surface immediately. Part A and part B of the exposed aggregate architectural coating, when pre-mixed separately and stored for later use, each have a shelf life of twelve months when stored in a dry location, protected from moisture, from direct sunlight, and stored in an undamaged, uncompromised storage container.

The foregoing detailed description has set forth various embodiments of the system and/or methods by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of materials, compositions, methods, techniques, or virtually any combination thereof.

Those skilled in the art will recognize that it is common within the art to describe systems and/or methods in the fashion set forth herein, and thereafter use engineering practices to integrate such described systems and/or methods into other similar systems. That is, at least a part of the systems and/or methods described herein may be integrated into a cement-based coating system and/or method via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for the sake of clarity.

A system and method for an exposed aggregate architectural coating has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method for preparing and applying an exposed aggregate architectural coating, comprising:
    preparing a first composition by combining 41 to 50 percent sand with 50 to 59 percent cement;
    preparing a second composition by combining 75 to 86 percent water with 14 to 25 percent glue;
    combining the first composition with the second composition to form an exposed aggregate architectural coating;
    preparing a pre-existing cement structure to create a roughened surface having a concrete surface profile of three or greater; and
    applying the exposed aggregate architectural coating to the roughened surface of the pre-existing cement structure by evenly spreading the exposed aggregate architectural coating onto the roughened surface to create an even thickness of the exposed aggregate architectural coating, wherein the exposed aggregate architectural coating forms a thickness of between $\frac{1}{32}$nd of an inch and one-fourth of an inch above the roughened surface, wherein combining the first composition with the second composition to form the exposed aggregate architectural coating occurs prior to applying the exposed aggregate architectural coating to the roughened surface of the pre-existing cement structure.

2. The method of claim 1, wherein the first composition of the exposed aggregate architectural coating is comprised of 47 percent sand and 53 percent cement.

3. The method of claim 1, wherein the first composition of the exposed aggregate architectural coating is comprised of 41 percent sand and 59 percent cement.

4. The method of claim 1, wherein roughening the pre-existing cement structure to create the roughened surface respects any pre-existing structures within the pre-existing cement structure.

5. The method of claim 1, wherein applying the exposed aggregate architectural coating to the roughened surface of the pre-existing cement structure is achieved by spreading the exposed aggregate architectural coating to a desired thickness using a gauge rake method, a squeegee method, a spray method, a screeding method, a rodding method, or a combination thereof.

6. The method of claim 5, wherein applying the exposed aggregate architectural coating to the roughened surface of the pre-existing cement structure is further achieved by troweling the exposed aggregate architectural coating after it has been spread to the desired thickness, such that the exposed aggregate architectural coating has a smooth and uniform consistency.

7. The method of claim 1, wherein applying the exposed aggregate architectural coating to the roughened surface of the pre-existing cement structure further includes broadcasting aggregates to the exposed aggregate architectural coating to create a customized exposed aggregate architectural coating appearance.

8. A method for preparing and applying an exposed aggregate architectural coating to a flooring surface, comprising:
    preparing a first composition by combining 41 to 50 percent sand with 50 to 59 percent cement;
    preparing a second composition by combining 75 percent water with 25 percent glue;
    combining the first composition with the second composition to form an exposed aggregate architectural coating;
    preparing a pre-existing cement structure to create a roughened surface having a concrete surface profile of three or greater; and
    applying the exposed aggregate architectural coating to the roughened surface of the pre-existing cement structure by evenly spreading the exposed aggregate architectural coating onto the roughened surface to create an even thickness of the exposed aggregate architectural coating, wherein the exposed aggregate architectural coating forms a thickness of between $\frac{1}{32}$nd of an inch and one-fourth of an inch, wherein combining the first composition with the second composition to form the exposed aggregate architectural coating occurs prior to applying the exposed aggregate architectural coating to the roughened surface of the pre-existing cement structure.

9. The method of claim 8, wherein the first composition of the exposed aggregate architectural coating is comprised of 47 percent sand and 53 percent cement.

10. The method of claim 8, wherein the first composition of the exposed aggregate architectural coating is comprised of 41 percent sand and 59 percent cement.

11. The method of claim 8, wherein roughening the pre-existing cement structure to create the roughened surface respects any pre-existing structures within the pre-existing cement structure.

12. The method of claim 8, wherein applying the exposed aggregate architectural coating to the roughened surface of the pre-existing cement structure is achieved by spreading the exposed aggregate architectural coating to a desired thickness using a gauge rake method, a squeegee method, a spray method, a screeding method, a rodding method, or a combination thereof.

13. The method of claim 12, wherein applying the exposed aggregate architectural coating to the roughened surface of the pre-existing cement structure is further achieved by troweling the exposed aggregate architectural coating after it has been spread to the desired thickness, such that the exposed aggregate architectural coating has a smooth and uniform consistency.

14. The method of claim 8, wherein applying the exposed aggregate architectural coating to the roughened surface of the pre-existing cement structure further includes broadcasting aggregates to the exposed aggregate architectural coating to create a customized exposed aggregate architectural coating appearance.

15. A method for preparing and applying an exposed aggregate architectural coating to a wall surface, comprising:
   preparing a first composition by combining 41 to 50 percent sand with 50 to 59 percent cement;
   preparing a second composition by combining 86 percent water with 14 percent glue;
   combining the first composition with the second composition to form an exposed aggregate architectural coating;
   preparing a pre-existing cement structure to create a roughened surface having a concrete surface profile of three or greater; and
   applying the exposed aggregate architectural coating to the roughened surface of the pre-existing cement structure by evenly spreading the exposed aggregate architectural coating onto the roughened surface to create an even thickness of the exposed aggregate architectural coating, wherein the exposed aggregate architectural coating forms a thickness of between $\frac{1}{32}$nd of an inch and one-fourth of an inch, wherein combining the first composition with the second composition to form the exposed aggregate architectural coating occurs prior to applying the exposed aggregate architectural coating to the roughened surface of the pre-existing cement structure.

16. The method of claim 15, wherein the first composition of the exposed aggregate architectural coating is comprised of 47 percent sand and 53 percent cement.

17. The method of claim 15, wherein the first composition of the exposed aggregate architectural coating is comprised of 41 percent sand and 59 percent cement.

18. The method of claim 15, wherein roughening the pre-existing cement structure to create the roughened surface respects any pre-existing structures within the pre-existing cement structure.

19. The method of claim 15, wherein applying the exposed aggregate architectural coating to the roughened surface of the pre-existing cement structure is achieved by spreading the exposed aggregate architectural coating to a desired thickness using a gauge rake method, a squeegee method, a spray method, a screeding method, a rodding method, or a combination thereof.

20. The method of claim 19, wherein applying the exposed aggregate architectural coating to the roughened surface of the pre-existing cement structure is further achieved by troweling the exposed aggregate architectural coating after it has been spread to the desired thickness, such that the exposed aggregate architectural coating has a smooth and uniform consistency.

\* \* \* \* \*